(12) United States Patent
Lee

(10) Patent No.: US 6,728,468 B2
(45) Date of Patent: Apr. 27, 2004

(54) DIGITAL VIDEO CASSETTE RECORDER FOR PREVENTING PICTURE DISTORTION DURING SEARCH AND METHOD FOR PROCESSING PICTURE USING THE SAME

(75) Inventor: Hyung-joo Lee, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/108,315

(22) Filed: Jul. 1, 1998

(65) Prior Publication Data

US 2003/0133697 A1 Jul. 17, 2003

(30) Foreign Application Priority Data

Jul. 2, 1997 (KR) ............................................ 97-30653

(51) Int. Cl.[7] ................................................. H04N 5/91
(52) U.S. Cl. .......................................... 386/68; 386/69
(58) Field of Search ........................... 386/113, 52, 55, 386/46, 4, 64, 68, 67, 69, 6, 7, 77, 80, 81; H04N 5/91

(56) References Cited

U.S. PATENT DOCUMENTS

| | | | |
|---|---|---|---|
| 4,485,412 A | * | 11/1984 | Sugiyama et al. |
| 5,126,851 A | * | 6/1992 | Yoshimura et al. |
| 5,179,479 A | | 1/1993 | Ahn |
| 5,233,485 A | * | 8/1993 | Yang |
| 5,406,381 A | | 4/1995 | Han |
| 5,418,623 A | | 5/1995 | Park |
| 5,452,096 A | | 9/1995 | Ito |
| 5,479,265 A | | 12/1995 | Kim |
| 5,510,899 A | | 4/1996 | Kim |
| 5,523,896 A | | 6/1996 | Park |
| 5,528,382 A | | 6/1996 | Kato |
| 5,583,936 A | | 12/1996 | Wonfor |
| 5,587,789 A | | 12/1996 | Lee |
| 5,675,693 A | | 10/1997 | Kagoshima |
| 5,748,332 A | | 5/1998 | Lee |

FOREIGN PATENT DOCUMENTS

| | | |
|---|---|---|
| JP | 3-11890 | 1/1991 |
| JP | 6-325442 | 11/1994 |

* cited by examiner

*Primary Examiner*—Robert Chevalier
(74) *Attorney, Agent, or Firm*—Robert E. Bushnell, Esq.

(57) ABSTRACT

A digital video cassette recorder capable of preventing a picture from being distorted during a search, and a method for processing a picture according to the same are provided. The digital video cassette recorder includes a search command applier, a reproduction unit for outputting data reproduced in a normal mode according to a fourth control signal, a switch for selecting reproduced data output by the reproduction unit for a predetermined time according to a first control signal, a memory for storing the image data which is reproduced at the normal mode and output from the switch, a display for displaying the image data stored in the memory according to a second control signal, a capstan motor for converting a traveling speed of a tape in accordance with a normal reproduction mode or a search mode according to a third control signal, and a controller for outputting the fourth, first, second and third control signals for controlling the reproduction unit, the switch, the display and the capstan motor, respectively, when a search command is provided by the search command applier. As a result, picture distortion occurring on the display during search can be prevented.

18 Claims, 4 Drawing Sheets

DIGITAL VIDEO CASSETTE RECORDER FOR PREVENTING PICTURE DISTORTION DURING SEARCH AND METHOD FOR PROCESSING PICTURE USING THE SAME

CLAIM OF PRIORITY

This application makes reference to, incorporates the same herein, and claims all benefits accruing under 35 U.S.C. §119 from an application for DIGITAL VIDEO CASSETTE RECORDER FOR PREVENTING PICTURE DISTORTION DURING SEARCH AND METHOD FOR PROCESSING PICTURE USING THE SAME earlier filed in the Korean Industrial Property Office on the $^{nd}$ of July 1997 and there duly assigned Serial No. 30653/1997.

BACKGROUND OF THE INVENTION

1. Technical Field

The present invention relates to a digital video cassette recorder, and more particularly, to a digital video cassette recorder for preventing picture distortion during search, and a method for processing a picture using the same.

2. Related Art

Analog video cassette recorders adopt a consecutive recording method, but digital video cassette recorders adopt a non-consecutive recording method. Thus, the digital video cassette recorder displays a non-recognizable image, (i.e., an image signal whose image pixels are not arranged) on its screen, while image data recorded in a recording medium is searched.

The digital video cassette recorder has a search mode and a normal reproduction mode. The digital video cassette recorder cannot reproduce a picture having the quality of a normal picture in the search mode, since it scans more tracks at a time than in the normal reproduction mode. Accordingly, image data which is difficult for a human to recognize is displayed during the search mode.

The following patents are considered to be representative of the prior art, and are burdened by the disadvantages set forth herein: U.S. Pat. No. 5,583,936 to Wonfor et al. entitled Video Copy Protection Process Enhancement To Introduce horizontal And Vertical Picture Distortions, U.S. Pat. No. 5,452,096 to Ito, entitled Recording/Reproducing Apparatus Wherein The Same Frame Of A Video Signal Is Repeatedly Read Out Of A Memory To Produce Special Effects, U.S. Pat. No. 5,179,479 to Ahn, entitled Method Of High Speed Searching For A Desired Tape Portion In A Digital Audio Tape Recorder, U.S. Pat. No. 5,748,332 to Lee, entitled Video Repeat Reproduction Method And Apparatus, U.S. Pat. No. 5,233,485 to Yang, entitled Index Search Method And system Thereof For Digital Video Cassette Tape Recorder, U.S. Pat. No. 5,406,381 to Han, entitled Character-Displayed Index Search System And Method, U.S. Pat. No. 5,510,889 to Kim, entitled Method Of Multi-Speed Recording-Reproducing A Video Signal I Digital Video Cassette Recorder, U.S. Pat. No. 5,523,896 to Park, entitled Variable Speed Reproducing Apparatus For A Digital Video Cassette Recorder, U.S. Pat. No. 5,528,382 to Kato et al., entitled Reproduction Apparatus For Video Signals Accompanied By Control Information. U.S. Pat. No. 5,587,789 to Lee et al., entitled Apparatus And Method For Controlling Recording And Reproduction In Digital Video Cassette Tape Recorder, U.S. Pat. No. 5,479,265 to Kim et al., entitled Video Data Recording Apparatus For Digital Video Cassette Recorder, U.S. Pat. No. 5,418,623 to Park, entitled Method Of Recording And Reproducing A Video Signal With Improved Quality During Variable Speed Operation, and U.S. Pat. No. 5,675,693 to Kagoshima, entitled Video Signal Reproducing Apparatus With Plural Search Functions.

SUMMARY OF THE INVENTION

To solve the above problem, an object of the present invention is to provide a digital video cassette recorder which prevents picture distortion during search by scanning some frames in a normal mode and displaying the scanned frames on a screen before execution of a search operation, and by simultaneously controlling the search operation to be executed in a search mode.

It is another object of the present invention to provide a picture processing method using the technique of the above digital video cassette recorder.

To accomplish the first object, there is provided a digital video cassette recorder which includes: a search command applier; a reproduction unit for outputting data reproduced at a normal mode according to a fourth control signal; a switch for selecting reproduced data output by the reproduction unit for a predetermined time according to a first control signal; a memory for storing the image data which is reproduced in the normal mode and output from the switch; a display for displaying the image data stored in the memory according to a second control signal; a capstan motor for converting the traveling speed of a tape depending on a normal reproduction mode or search mode according to a third control signal; and a controller for outputting the fourth, first, second and third control signals for controlling the reproduction unit, the switch, the display and the capstan motor, respectively, when a search command is applied from the search command applier. The predetermined time mentioned above is the time for normally reproducing a predetermined number of frames.

To accomplish the second object, there is provided a method of processing a screen picture during search, comprising the steps of: (a) applying a search command; (b) reproducing a predetermined number of frames in a normal mode; (c) storing image data reproduced in the normal as mode; (d) executing search operation simultaneously while displaying the stored image data; (e) ad preventing reproduced data from being displayed and displaying searched data instead if desired image data is searched; and (f) determining whether display of the searched data is completed, and whether the search operation will continue. If the display of the searched data is completed and a new search is to continue in step (f), the steps (d) to (f) are repeated. Also, if the display of the searched data is completed and a new search is to continue in step (f), the steps (b) to (f) are repeated. In addition, the searching step (d) comprises the steps of: converting a traveling speed of a tape to a traveling speed used during the search; and preventing data reproduced during the search from being displayed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
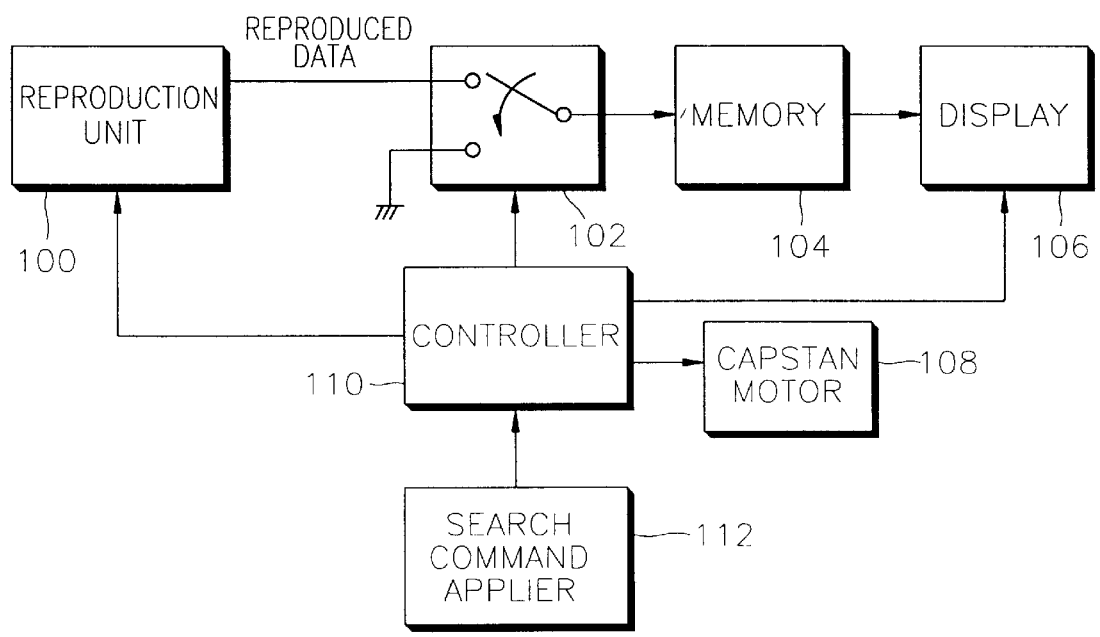
FIG. 1 is a block diagram showing the configuration of a digital video cassette recorder according to the present invention.

Referring to FIG. 1, a digital video cassette recorder includes a reproduction unit 100, a switch 102, a memory 104, a display 106, a capstan motor 108, a controller 110 and a search to command applier 112.

Figure 2:
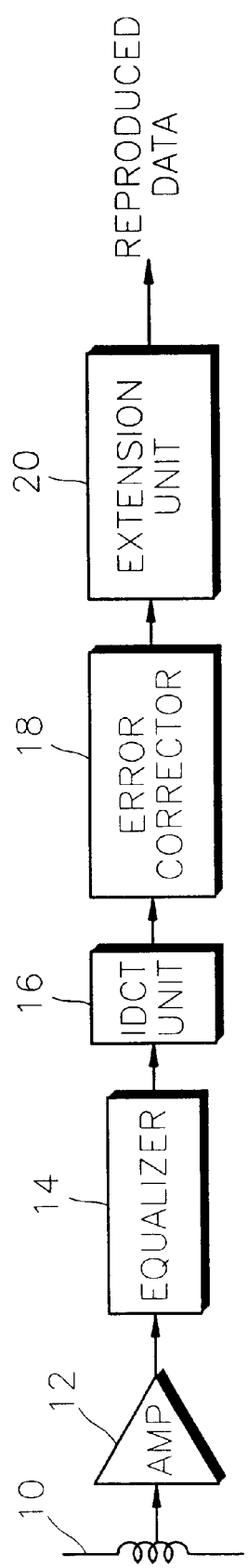
FIG. 2 is a detailed block diagram of the reproducing unit shown in FIG. 1.

Referring to FIG. 2, the reproduction unit 100 includes a reproduction head 10, an amplifier 12, an equalizer 14, an inverse discrete cosine transformer (IDCT) unit 16, an error corrector 18 and an extension unit 20. Unit 100 outputs reproduced data for a predetermined time according to a fourth control signal output by the controller 110.

The switch 102 selects the reproduced data output from the reproduction unit 100 for a predetermined time according to a first control signal output by the controller 110. That is, the switch 102 selects the reproduced data if the first control signal is a high level, and interrupts selection of the reproduced data if the first control signal is a low level.

The memory 104 stores image data which is reproduced in a normal reproduction mode and output from the switch 102.

The display 106 displays the image data stored in the memory 104 according to a second control signal output by the controller 110. That is, the display 106 displays the image data stored in the memory 104 if the second control signal is a high level, and displays searched image data if the second control signal is a low level.

The capstan motor 108 determines the traveling speed of the tape depending on a normal reproduction mode or search mode according to a third control signal output by the controller 110. That is, if the third control signal is a high level, the capstan motor 108 spins at a speed appropriate for the normal reproduction mode. If the third control signal is a low level, the capstan motor 108 spins at a speed appropriate for the search mode.

The controller 10 provides the fourth, first, second and third control signals for controlling the reproduction unit 100, the switch 102, the display 106 and the capstan motor 108, respectively.

That is, the controller 110 controls the reproduction unit 100 and the capstan motor 108 to output normal reproduced data for a predetermined time when a search command is applied from the search command applier 112. The controller 110 controls the switch 102 to select reproduced data output by the reproduction unit 100. The term "predetermined time" denotes a period during which reproduced data of two or three frames can be output. The controller 110 controls the display 106 to display the reproduced data read from the memory 104, and simultaneously controls the capstan motor 108 to rotate the tape at a search mode speed.

The operation of the device shown in FIG. 1 will now be described. After a search command is provided by the search command applier 112, the controller 110 controls the capstan motor 108 to maintain the traveling speed at a value at which normal reproduction is conducted, and controller 110 controls the reproduction unit 100 to output normal reproduced data by operating some frames (e.g., two or three frames) at the normal reproduction mode. Also, the controller 110 controls the switch 102 to select data reproduced by the reproduction unit 100. At this time, the memory 104 stores the reproduced data output via the switch 102.

The controller 110 also controls the display 106 to display the normal reproduced data stored in the memory 104, controls the switch 102 to connect or disconnect the normal reproduced data, and controls the capstan motor 108 to rotate a tape at a predetermined search mode speed.

When the search command is provided, image data having some frames reproduced during the normal reproduction mode is continuously displayed on the display 106, and a search operation in is conducted simultaneously so that the user does not see distorted picture during the search. When desired searched data is detected, the searched image data is displayed on the display 106.

In the above-described embodiment, extended reproduced data is selected by the switch 102 for a predetermined time. After the predetermined time elapses, the switch 102 interrupts the selection of the reproduced data. However, the selection and non-selection of a reproduced signal using the switch 102 can be performed on reproduced data output from other blocks of the reproduction unit 100. The memory 104 can be an error-correction memory (not shown) or a de-shuffling memory (not shown).

A picture displayed on the display 106 during a search can be updated by performing selection or non-selection via the switch 102 in units of a predetermined number of reference frames.

Figure 3:
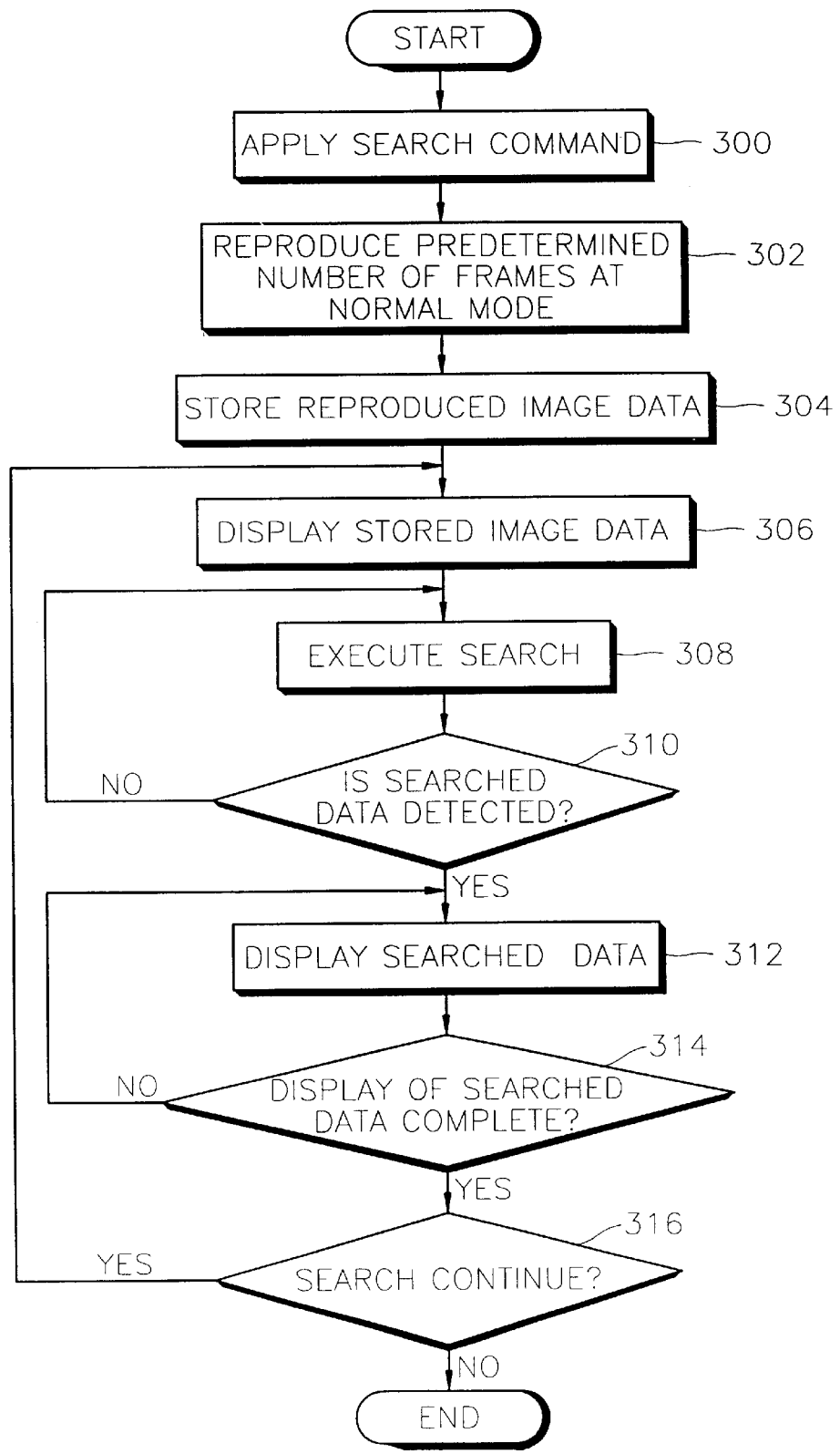
FIG. 3 is a flowchart illustrating a method of processing a picture during search according to a first embodiment of the present invention.

FIG. 3 is a flowchart illustrating a method for processing a screen picture during search according to a first embodiment of the present invention.

In the method for processing a screen picture during a search as shown in FIG. 3, data reproduced in the normal reproduction mode when the search begins is stored only one time, and the stored normal reproduced data is continuously displayed during the search. After searched data is detected, the reproduced data being displayed is converted to the searched data, and the searched data is then displayed. Accordingly, the image data reproduced in the normal mode upon the initiation of the search continues to be displayed until the search is ended.

Hereinbelow, the flowchart shown in FIG. 3 will be described in more detail.

A search command is provided in step 300.

A predetermined number of frames is reproduced in a normal mode in step 302.

Image data reproduced in the normal mode is stored in a predetermined memory in step 304.

The stored image data is displayed on a display in step 306, and the search is conducted in step 308. In order to execute the search, the capstan motor 108 (FIG. 1) spins at a search speed, and data reproduced during the search is prevented from being displayed on the display 106.

A determination of whether desired image data is detected during the search is made in step 310 (FIG. 3). If the desired image data is not detected, step 308 is repeated; if the desired image data is detected, the reproduced data being displayed is eliminated and the searched data is displayed instead in step 312.

A determination of whether display of the searched data is completed is made in step 314. If display of the searched data is finished a determination is made in step 316 as to whether the search is to continue. If it is determined that the search is not to continue, the search is ended. If it is determined that the search continues, the stored image data is displayed in step 306, and steps 308 thru 316 are performed.

Figure 4:
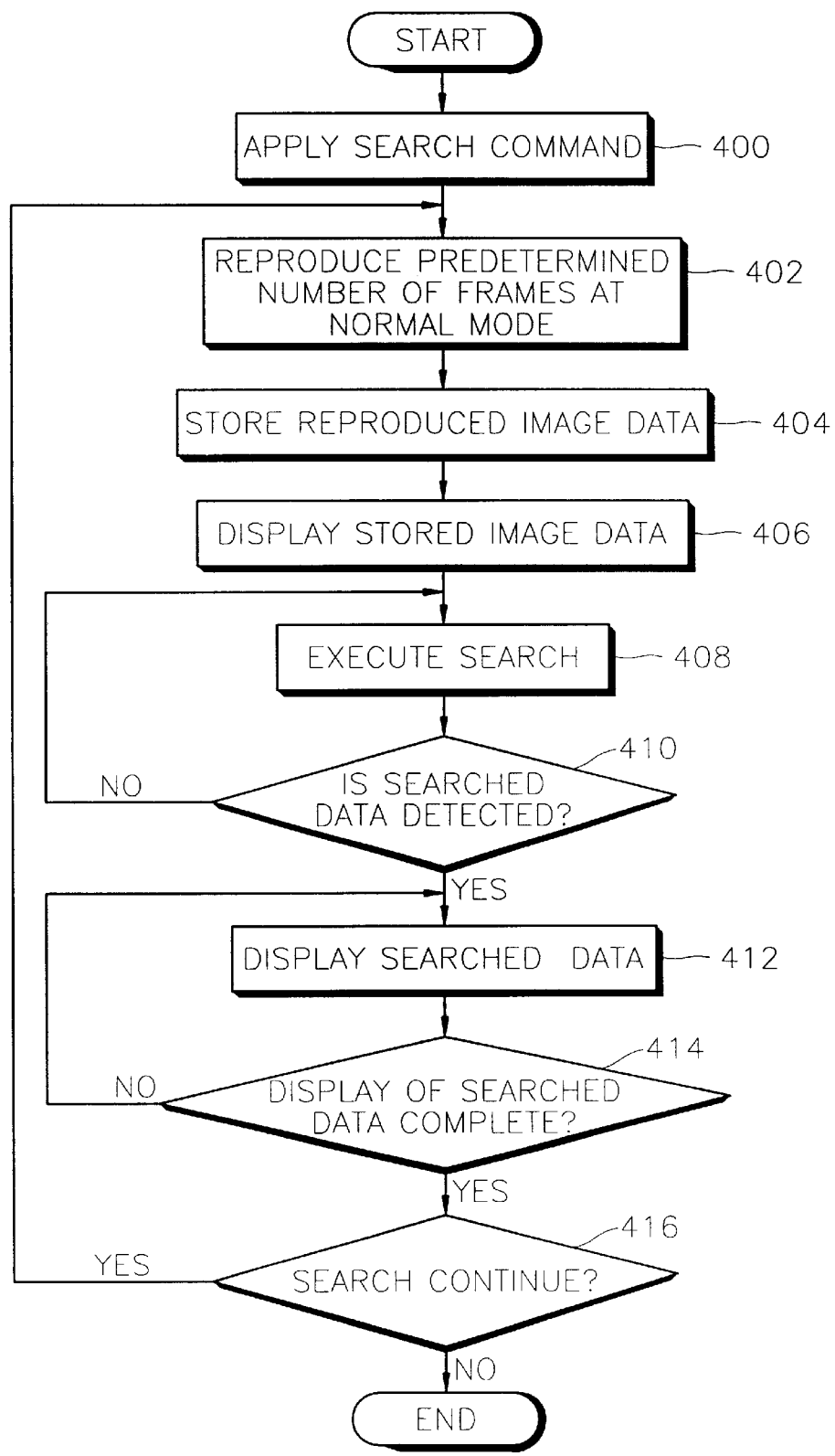
FIG. 4 is a flowchart illustrating a method of processing a picture during search according to a second embodiment of the present invention.

FIG. 4 is a flowchart illustrating a method for processing a screen picture during search according to a second embodiment of the present invention.

In the method of processing a screen during search as shown in FIG. 4, whenever the search continues, data reproduced in a normal mode is stored, and then the stored normal reproduced data is displayed during the search. Thus, whenever the search resumes, the normal reproduced image data is changed and displayed.

Now, the method shown in FIG. 4 will be described in more detail as follows.

A search command is provided in step 400.

A predetermined number of frames is reproduced in a normal mode in step 402.

Image data reproduced in the normal mode is stored in a predetermined memory in step 404.

The stored image data is displayed on a display in step 406, and the search is conducted in step 408. In order to execute the search, the capstan motor 108 (FIG. 1) spins at a search speed, and data reproduced during the search is prevented from being displayed on the display 106.

A determination as to whether desired image data is detected during search is made in step 410. If the desired image data is not detected, the step 408 is repeated; and if the desired image data is detected, the reproduced data being displayed is eliminated and the searched data is displayed instead in step 412.

A determination as to whether display of the searched data is completed is made in step 414. If display of the searched data is finished, a determination is made in step 414 as to whether the search will continue. If it is determined that the search will no longer continue, the search is ended. If it is determined that the search will continue, steps 402 thru 416 are repeated.

According to the present invention described above, screen picture distortion occurring on the display during the search can be prevented.

It should be understood that the present invention is not limited to the particular embodiment g disclosed herein as the best mode contemplated for carrying out the present invention, but rather that e the present invention is not limited to the specific embodiments described in this specification except as defined in the appended claims.

What is claimed is:

1. A digital video cassette recorder, comprising:
command means for providing a search command;
reproduction means for outputting data reproduced in a normal mode of operation in response to a fourth control signal;
switch means connected to said reproduction means for selecting the data output by the reproduction means for a predetermined time period in response to a first control signal;
memory means connected to said switch means for storing the data output selected by said switch means;
display means connected to said memory means for displaying the data output stored in said memory means in response to a second control signal;
capstan motor means for adjusting a traveling speed of a tape in accordance with a normal reproduction mode or a search mode in response to a third control signal; and
controller means for outputting the fourth, first, second and third control signals for controlling said reproduction means, said switch means, said display means and said capstan motor means, respectively, when the search command is provided by said command means, said control means preventing data reproduced during a search from being displayed on said display means.

2. The digital video cassette recorder as claimed in claim 1, wherein said predetermined time period is a time for normally reproducing a predetermined number of frames.

3. A method of processing a screen picture during a search, comprising the steps of:
(a) providing a search command;
(b) reproducing a predetermined number of frames in a normal mode of operation;
(c) storing image data reproduced in the normal mode of operation;
(d) executing the search to detect desired image data while displaying the stored image data;
(e) preventing reproduced data from being displayed and displaying detected data instead when desired image data is detected; and
(f) determining whether display of the detected data is completed and whether the search operation will continue;
wherein, when the display of the searched data is completed and the search operation is to continue, said steps (d) to (f) are repeated.

4. The method of processing a screen picture during a search as claimed in claim 3, wherein when the display of the searched data is completed and the search operation is to continue, said steps (b) to (f) are repeated.

5. The method of processing a screen picture during a search as claimed in claim 4, wherein said step (d) comprises the steps of:
converting a traveling speed of a tape to a traveling speed used during the search; and
preventing data reproduced during the search from being displayed.

6. The method of processing a screen picture during a search as claimed in claim 3, wherein said step (d) comprises the steps of:
converting a traveling speed of a tape to a traveling speed used during the search; and
preventing data reproduced during the search from being displayed.

7. A digital video cassette recorder, comprising:
command means for providing a search command;
reproduction means for outputting data reproduced in a normal mode of operation in response to a first control signal;
switch means connected to said reproduction means for selecting the data output by the reproduction means for a predetermined time period in response to a second control signal;
motor means for adjusting a traveling speed of a tape in accordance with a normal reproduction mode and a search mode, respectively, in response to a third control signal;
controller means connected to said command means, said reproduction means, said switch means and said motor means for providing said first, second and third control signals for controlling said reproduction means, said switch means and said motor means, respectively, when the search command is provided by said command means; and output means connected to said switch means for outputting the data selected by said switch means, wherein said output means comprises a memory for storing the data output selected by said switch means, and a display unit for displaying the data output stored by said memory, and wherein said controller means is connected directly to said display unit for providing a fourth control signal for controlling the display unit.

8. A method for processing a screen picture during a search, comprising the steps of:

providing a search command;

reproducing a predetermined number of frames in a normal mode of operation;

storing image data reproduced in the normal mode of operation;

executing the search to detect desired image data while displaying the stored image data;

preventing the data reproduced in the normal mode of operation from being displayed and displaying the detected desired image data instead when the desired image data is detected; and determining whether display of the searched data is completed; and when the display of the searched data is not completed, displaying the searched data.

9. The method of processing a screen picture during a search as claimed in claim 8, further comprising the step of:

when the display of the searched data is completed, determining whether the search is to continue.

10. The method of processing a screen picture during a search as claimed in claim 9, further comprising returning to the step of storing the image data reproduced in the normal mode of operation when the search is to continue.

11. The method of processing a screen picture during a search as claimed in claim 8, wherein the step of executing the search to detect the desired image data while displaying the stored image data comprises the steps of:

converting a traveling speed of a tape to a traveling speed used during the search; and preventing data reproduced during the search from being displayed.

12. The digital video cassette recorder as claimed in claim 1, wherein said controller means is connected to said reproduction means, said switch means, said display means and said capstan motor means for providing said fourth, first, second and third control signals, respectively, thereto.

13. The digital video cassette recorder as claimed in claim 7, wherein said controller means is connected to said reproduction means, said switch means and said motor means for providing said first, second and third control signals, respectively, thereto.

14. A digital video cassette recorder, comprising:

command means for providing a search command;

controller means for controlling operation of said video cassette recorder by providing first, second and third control signals;

reproduction means connected to said controller means for outputting data reproduced in a normal mode of operation in response to said first control signal;

switch means connected to said controller means and to said reproduction means for selecting the data output by the reproduction means for a predetermined time period in response to said second control signal;

motor means connected to said controller means for adjusting a traveling speed of a tape in accordance with a normal reproduction mode and a search mode, respectively, in response to said third control signal; and output means connected to said switch means for outputting the data selected by said switch means;

said controller means controlling said reproduction means, said switch means and said motor means, respectively, when the search command is provided by said command means; and wherein said output means comprises a memory for storing the data output selected by said switch means, and a display unit connected directly to said controller means for displaying the data output stored by said memory in response to a fourth signal received from said controller means.

15. A digital video cassette recorder, comprising:

input means for receiving a search command;

reproducing means for reproducing a predetermined number of frames in a normal mode of operation;

storing means for storing image data reproduced in the normal mode of operation;

display means for displaying the stored image data;

executing means for executing a search to detect desired image data while the stored image data is being displayed by said display means;

preventing means for preventing the data reproduced in the normal mode of operation from being displayed, and for displaying the detected desired image data instead when the desired image data is detected; and determining means for determining whether display of the searched data is completed;

wherein, when said determining means determines that the display of the searched data is not completed, said displaying means displays the searched data.

16. The video cassette recorder as claimed in claim 15, wherein:

when said determining means determines that the display of the searched data is completed, said determining means determines whether the search is to continue.

17. The video cassette recorder as claimed in claim 16, wherein:

wherein said determining means determines that the search is to continue, said storing means stores the image data reproduced in the normal mode of operation.

18. The video cassette recorder as claimed in claim 15, wherein said executing means detects the desired image data while the stored image data is being displayed by converting a traveling speed of a tape to a traveling speed used during the search, and by preventing data reproduced during the search from being displayed.

* * * * *